United States Patent
Tsurutome et al.

(10) Patent No.: US 9,285,239 B2
(45) Date of Patent: Mar. 15, 2016

(54) USER INTERFACE FOR CONTENT CHANNEL HUD (HEADS-UP DISPLAY) AND CHANNEL SETS FOR LOCATION-BASED MAPS

(75) Inventors: Kevin Tsurutome, San Francisco, CA (US); Darrell Sano, Oakland, CA (US); Sean Murphy, Pleasant Hill, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 12/588,144

(22) Filed: Oct. 6, 2009

(65) Prior Publication Data

US 2010/0087207 A1    Apr. 8, 2010

Related U.S. Application Data

(60) Provisional application No. 61/136,828, filed on Oct. 7, 2008.

(51) Int. Cl.
| | | |
|---|---|---|
| *H04W 24/00* | (2009.01) | |
| *G01C 21/36* | (2006.01) | |
| *H04W 4/02* | (2009.01) | |

(52) U.S. Cl.
CPC ............. *G01C 21/3679* (2013.01); *H04W 4/02* (2013.01)

(58) Field of Classification Search
USPC ...................... 455/456.3, 466, 415, 419, 423; 701/200, 208, 209
See application file for complete search history.

(56) References Cited

U.S. PATENT DOCUMENTS

| | | |
|---|---|---|
| 5,263,136 A | 11/1993 | DeAguiar et al. |
| 5,359,529 A | 10/1994 | Snider |
| 5,832,408 A | 11/1998 | Tamai |
| 6,064,941 A | 5/2000 | Nimura |
| 6,119,013 A | 9/2000 | Maloney |
| 6,185,427 B1 | 2/2001 | Krasner |
| 6,317,686 B1 | 11/2001 | Ran |
| 6,377,810 B1 | 4/2002 | Geiger |
| 6,401,034 B1 | 6/2002 | Kaplan |
| 6,424,912 B1 | 7/2002 | Correia |
| 6,434,482 B1 | 8/2002 | Oshida |
| 6,470,189 B1 | 10/2002 | Hill et al. |
| 6,480,783 B1 | 11/2002 | Myr |
| 6,487,495 B1 | 11/2002 | Gale |

(Continued)

FOREIGN PATENT DOCUMENTS

| | | |
|---|---|---|
| CA | WO2006/125291 | 11/2006 |
| EP | 1128163 | 8/2001 |

(Continued)

OTHER PUBLICATIONS

International Search Report in PCT/US2008/10543 dated Aug. 19, 2010.

(Continued)

*Primary Examiner* — Nathan Taylor
(74) *Attorney, Agent, or Firm* — William H. Bollman (57) ABSTRACT

A navigation device for displaying at least one point-of-interest on a map comprises a channel set module to record a user defined channel set. The channel set includes at least one point-of-interest criteria. A channel set options module provides a user of the navigation device with an option to select the channel set. A channel set display module displays the point-of-interest criteria associated with the user selected channel set.

5 Claims, 8 Drawing Sheets

(56) References Cited

U.S. PATENT DOCUMENTS

| | | |
|---|---|---|
| 6,507,785 B1 | 1/2003 | Stefan |
| 6,529,143 B2 | 3/2003 | Mikkola |
| 6,571,169 B2 | 5/2003 | Miyaki |
| 6,587,782 B1 | 7/2003 | Nocek |
| 6,628,938 B1 | 9/2003 | Rachabathuni |
| 6,636,803 B1* | 10/2003 | Hartz, Jr. et al. ............. 701/459 |
| 6,671,424 B1 | 12/2003 | Skoll |
| 6,690,940 B1 | 2/2004 | Brown |
| 6,714,205 B1 | 3/2004 | Miyashita et al. |
| 6,820,092 B2 | 11/2004 | Nakano |
| 6,862,524 B1 | 3/2005 | Nagda |
| 6,940,407 B2 | 9/2005 | Miranda-Knapp et al. |
| 6,954,697 B1 | 10/2005 | Smith |
| 6,963,748 B2 | 11/2005 | Chithambaram |
| 6,976,253 B1 | 12/2005 | Wierman |
| 7,054,743 B1 | 5/2006 | Smith |
| 7,093,286 B1 | 8/2006 | King |
| 7,123,874 B1 | 10/2006 | Brennan |
| 7,155,339 B2 | 12/2006 | Tu |
| 7,373,246 B2 | 5/2008 | O'Clair |
| 7,379,729 B2 | 5/2008 | Holland et al. |
| 7,409,219 B2 | 8/2008 | Levitan |
| 7,480,566 B2 | 1/2009 | Laverty |
| 7,546,202 B2 | 6/2009 | Oh |
| 565,239 A1 | 7/2009 | De Silva et al. |
| 7,627,656 B1 | 12/2009 | Anand et al. ................. 709/220 |
| 7,706,977 B2 | 4/2010 | Soehren |
| 7,853,403 B2 | 12/2010 | Tanaka |
| 7,873,370 B2 | 1/2011 | Shim |
| 8,095,434 B1 | 1/2012 | Puttick |
| 8,200,291 B2 | 6/2012 | Steinmetz |
| 8,265,864 B1 | 9/2012 | Kaufman |
| 8,296,062 B2 | 10/2012 | Yamane |
| 2001/0021894 A1 | 9/2001 | Sakamoto |
| 2001/0038626 A1 | 11/2001 | Dynarski |
| 2001/0047241 A1 | 11/2001 | Khavakh |
| 2001/0048387 A1 | 12/2001 | Sheynblat |
| 2002/0021231 A1 | 2/2002 | Schlager |
| 2002/0037716 A1 | 3/2002 | McKenna et al. |
| 2002/0042819 A1 | 4/2002 | Reichert et al. |
| 2002/0082774 A1 | 6/2002 | Bloebaum |
| 2002/0098851 A1 | 7/2002 | Walczak |
| 2002/0147023 A1 | 10/2002 | Sawada |
| 2002/0171581 A1 | 11/2002 | Sheynblat |
| 2002/0190861 A1 | 12/2002 | Wentworth |
| 2003/0033083 A1 | 2/2003 | Nakashima |
| 2003/0036848 A1* | 2/2003 | Sheha et al. ................. 701/209 |
| 2003/0055555 A1 | 3/2003 | Knockheart |
| 2003/0071728 A1 | 4/2003 | McDonald |
| 2003/0095525 A1 | 5/2003 | Lavin |
| 2003/0128211 A1 | 7/2003 | Watanabe |
| 2003/0182052 A1 | 9/2003 | Delorme |
| 2003/0227911 A1 | 12/2003 | Trossen |
| 2004/0003125 A1 | 1/2004 | Ichimura |
| 2004/0023645 A1 | 2/2004 | Olsen |
| 2004/0027258 A1 | 2/2004 | Pechatnikov |
| 2004/0030493 A1 | 2/2004 | Pechatnikov |
| 2004/0067773 A1 | 4/2004 | Rachabathuni |
| 2004/0105433 A1 | 6/2004 | Seo |
| 2004/0135784 A1 | 7/2004 | Cohen et al. |
| 2004/0158829 A1 | 8/2004 | Beresin |
| 2004/0183724 A1 | 9/2004 | Sheynblat |
| 2004/0185870 A1 | 9/2004 | Matsuda |
| 2004/0203603 A1 | 10/2004 | Pierce |
| 2004/0203873 A1 | 10/2004 | Gray ........................ 455/456.1 |
| 2004/0209594 A1 | 10/2004 | Naboulsi |
| 2004/0215641 A1 | 10/2004 | Kuthuri |
| 2004/0217980 A1 | 11/2004 | Radburn |
| 2004/0224702 A1 | 11/2004 | Chaskar |
| 2004/0225437 A1 | 11/2004 | Endo |
| 2004/0249568 A1 | 12/2004 | Endo |
| 2004/0260466 A1* | 12/2004 | Ichihara et al. ............... 701/209 |
| 2004/0266455 A1 | 12/2004 | Lee |
| 2005/0105496 A1 | 5/2005 | Ambrosino |
| 2005/0148342 A1 | 7/2005 | Sylvain |
| 2005/0149253 A1 | 7/2005 | Nambata |
| 2005/0188333 A1 | 8/2005 | Hunleth |
| 2005/0245249 A1 | 11/2005 | Wierman |
| 2005/0251331 A1 | 11/2005 | Kreft |
| 2005/0288033 A1 | 12/2005 | McNew |
| 2006/0015513 A1 | 1/2006 | Poyhonen et al. ............. 707/100 |
| 2006/0023626 A1 | 2/2006 | Krausz |
| 2006/0055693 A1 | 3/2006 | Sylthe |
| 2006/0064235 A1 | 3/2006 | Ishikawa |
| 2006/0089788 A1 | 4/2006 | Laverty |
| 2006/0089792 A1 | 4/2006 | Manber et al. |
| 2006/0105782 A1 | 5/2006 | Brock |
| 2006/0116818 A1 | 6/2006 | Chao et al. .................... 701/211 |
| 2006/0135178 A1 | 6/2006 | Allyn |
| 2006/0155679 A1 | 7/2006 | Kothuri |
| 2006/0167616 A1 | 7/2006 | Yamane |
| 2006/0167621 A1 | 7/2006 | Dale |
| 2006/0174209 A1 | 8/2006 | Barros |
| 2006/0200304 A1 | 9/2006 | Oh |
| 2006/0200308 A1 | 9/2006 | Arutunian |
| 2006/0206586 A1 | 9/2006 | Ling et al. |
| 2006/0223518 A1 | 10/2006 | Haney |
| 2006/0229802 A1* | 10/2006 | Vertelney et al. ............. 701/200 |
| 2006/0246922 A1 | 11/2006 | Gasbarro |
| 2006/0251008 A1 | 11/2006 | Wu |
| 2006/0253247 A1 | 11/2006 | De Silva et al. |
| 2007/0010942 A1 | 1/2007 | Bill |
| 2007/0015518 A1 | 1/2007 | Winter et al. |
| 2007/0036318 A1 | 2/2007 | Gits et al. ................. 379/202.01 |
| 2007/0072620 A1 | 3/2007 | Levitan |
| 2007/0083557 A1 | 4/2007 | Leiserowitz |
| 2007/0083649 A1 | 4/2007 | Zuzga |
| 2007/0105554 A1 | 5/2007 | Clark |
| 2007/0118520 A1* | 5/2007 | Bliss et al. ........................ 707/5 |
| 2007/0153983 A1 | 7/2007 | Bloebaum et al. |
| 2007/0155401 A1 | 7/2007 | Ward |
| 2007/0156334 A1 | 7/2007 | Vu |
| 2007/0162942 A1* | 7/2007 | Hamynen et al. ............. 725/105 |
| 2007/0174259 A1 | 7/2007 | Amjadi |
| 2007/0185985 A1 | 8/2007 | Shim |
| 2007/0213043 A1 | 9/2007 | Son .............................. 455/422.1 |
| 2007/0219706 A1* | 9/2007 | Sheynblat .................... 701/200 |
| 2007/0219708 A1 | 9/2007 | Brasche |
| 2007/0233817 A1 | 10/2007 | Johnson et al. |
| 2007/0238472 A1 | 10/2007 | Wanless |
| 2007/0239752 A1 | 10/2007 | Beitman |
| 2007/0253642 A1 | 11/2007 | Berrill |
| 2007/0281690 A1 | 12/2007 | Altman |
| 2007/0281707 A1 | 12/2007 | Thomson |
| 2007/0288613 A1 | 12/2007 | Sudame et al. .............. 709/223 |
| 2007/0298812 A1 | 12/2007 | Singh |
| 2008/0004043 A1 | 1/2008 | Wilson |
| 2008/0071465 A1 | 3/2008 | Chapman |
| 2008/0082262 A1 | 4/2008 | Silva et al. |
| 2008/0112372 A1 | 5/2008 | Thomson |
| 2008/0112551 A1 | 5/2008 | Forbes et al. ............... 379/142.1 |
| 2008/0113671 A1 | 5/2008 | Ghozati |
| 2008/0130597 A1 | 6/2008 | Kalhan ......................... 370/338 |
| 2008/0139114 A1 | 6/2008 | Ranganathan ............... 455/41.1 |
| 2008/0140307 A1 | 6/2008 | Chen |
| 2008/0146207 A1 | 6/2008 | Razdan |
| 2008/0153550 A1 | 6/2008 | Otaka |
| 2008/0171559 A1 | 7/2008 | Frank |
| 2008/0177462 A1* | 7/2008 | Yoshioka et al. ............. 701/200 |
| 2008/0177839 A1 | 7/2008 | Chang et al. |
| 2008/0218407 A1 | 9/2008 | Norda |
| 2008/0227463 A1 | 9/2008 | Hizume |
| 2008/0249983 A1* | 10/2008 | Meisels et al. .................... 707/3 |
| 2008/0261560 A1 | 10/2008 | Ruckart ......................... 455/411 |
| 2008/0268769 A1 | 10/2008 | Brown |
| 2008/0268822 A1 | 10/2008 | Johnson |
| 2008/0270366 A1 | 10/2008 | Frank |
| 2008/0275637 A1 | 11/2008 | Kim |
| 2008/0280599 A1 | 11/2008 | Cheng |
| 2008/0307445 A1 | 12/2008 | Garg ............................ 719/328 |
| 2008/0319652 A1 | 12/2008 | Moshfeghi |
| 2008/0319653 A1 | 12/2008 | Moshfeghi |
| 2009/0009397 A1 | 1/2009 | Taylor |
| 2009/0029675 A1 | 1/2009 | Steinmetz |

(56) References Cited

U.S. PATENT DOCUMENTS

| | | |
|---|---|---|
| 2009/0029693 A1 | 1/2009 | Liwell |
| 2009/0055087 A1 | 2/2009 | Beacher |
| 2009/0061852 A1 | 3/2009 | Feher |
| 2009/0061862 A1 | 3/2009 | Alberth |
| 2009/0144247 A1* | 6/2009 | Wistrand et al. ............ 707/3 |
| 2009/0192702 A1 | 7/2009 | Bourne |
| 2009/0237307 A1 | 9/2009 | Tsai |
| 2009/0298505 A1 | 12/2009 | Drane |
| 2009/0325615 A1 | 12/2009 | Mckay |
| 2010/0037057 A1 | 2/2010 | Shim et al. |
| 2010/0094550 A1 | 4/2010 | Tsurutome et al. |
| 2010/0167691 A1 | 7/2010 | Howarter |
| 2011/0003578 A1 | 1/2011 | Chen et al. |
| 2011/0035141 A1 | 2/2011 | Barker |
| 2011/0109468 A1 | 5/2011 | Hirschfeld |

FOREIGN PATENT DOCUMENTS

| | | |
|---|---|---|
| JP | 2008 039698 | 2/2008 |
| WO | WO2006/071271 | 7/2006 |

OTHER PUBLICATIONS

International Search Report in PCT/US2008/10542 dated Aug. 19, 2010.

PCT International Search Report in PCT/US2009/05487 dated Nov. 17, 2009.

U.S. Appl. No. 11/251,766, filed Oct. 2005, Barcklay.

International Search Report in PCT/US2009/05486 dated Jan. 21, 2010.

Ahern et al., "World Explorer: Visualizing Aggregate Data from Unstructured Text in Geo-Referened Collections," Jun. 18-23, 2007, ACM, JCDL'07.

European Search Report received in European Appl. No. 09819547.2 dated Oct. 16, 2012.

European Search Report received in European Appl. No. 09819546.4 dated Oct. 15, 2012.

John Krumm et al, "Map Matching with Travel Time Constraints", SAE 2007 World Congress, Apr. 19, 2007.

\* cited by examiner

USER INTERFACE FOR CONTENT CHANNEL HUD (HEADS-UP DISPLAY) AND CHANNEL SETS FOR LOCATION-BASED MAPS

The present invention claims priority from U.S. Provisional Application 61/136,828, filed Oct. 7, 2008, entitled "USER INTERFACE FOR CONTENT CHANNELHUD (HEADS-UP DISPLAY) AND CHANNEL SETS FOR LOCATION-BASED MAPS", to TSURUTOME et al., the entirety of which is expressly incorporated herein by reference.

BACKGROUND OF THE INVENTION

1. Field of the Invention

This invention relates generally to navigation devices. More particularly, it relates to location based services (LBS), and point-of-interest channel sets and display techniques in navigation applications that enable viewing by a user of a navigation device.

2. Background of the Related Art

Map web sites and mobile navigation applications include Points-of-Interests (POIs) that number in the millions. The sheer quantity of POIs available in a given service or product has become a marketing feature for product comparison. However, the usefulness and relevance to the end-user remains questionable. Out of 10 million POIs offered by a particular application, how many are truly used, are relevant to needs, or satisfy user interests is questionable.

Current navigation products structure POIs into categories that can be browsed through a multi-level hierarchy. However, this can be cumbersome if there are too many levels to drill-down through. Users are forced to sift through sub-categories that may be irrelevant while looking for what they truly need.

Nearly all services also include a free text search input box for a category or a brand name, with the results displayed either on a map or list. The results are typically ordered by distance from the user's current location. While useful for a specific, single POI, the search and display results cycle must be repeated for different POIs. Users must restart the search process on the initial POI search page, leaving the previous results to start the whole process over again.

Across most web sites and mobile products, users must browse through lengthy category hierarchies, or enter text and sift through matching results, then repeat this process for each different POI. Based on real-world feedback from users, personal interests vary widely. A single generic set of POIs simply does not cater to the needs or interests of individuals.

SUMMARY OF THE INVENTION

In accordance with the principles of the present invention, a navigation device for displaying at least one point-of-interest on a map comprises a channel set module to record a user defined at least one channel set, the at least one channel set comprising at least one point-of-interest criteria. A channel set options module provides a user of the navigation device with an option to select the at least one channel set. A channel set display module displays the at least one point-of-interest criteria associated with the user selected channel set.

In accordance with another aspect of the invention, an apparatus and method of displaying at least one point-of-interest on a map of a navigation device comprises recording a user defined at least one channel set, the at least one channel set comprises at least one point-of-interest criteria. The method provides a user of the navigation device with an option to select the at least one channel set, and if the option is selected, displays the at least one point-of-interest criteria associated with the user selected channel set.

DETAILED DESCRIPTION OF ILLUSTRATIVE EMBODIMENTS

The present invention provides a content channel heads-up display (HUD) for user defined POI(s). Initially, a user must find their POI(s). But once found, the user is presented with an option to save their POI(s) as a "POI channel". Alternately, the user may browse a predefined POI channel catalog and choose relevant content. POI channels are defined as persistent POI(s) that layer on a map. More than a single POI may persist, and users have the option to toggle visibility on and off, preferably with a maximum of 2 button clicks for any POI channel.

Since the POI channels disclosed herein are based on specific interests, POI channels are highly customized, providing for a useful user experience. An extension of the concepts disclosed herein includes POI channel "sets" that allow grouping of POI channels based on any criteria suitable for users, with the user being able to assign the POI channel set a suitable name. For example, business travelers may have a "Business Trips" POI channel set that includes specific car rental companies, hotels, wi-fi centers, and/or other services that have agreements with their own company, as well as customer locations and meeting places. In accordance with the principles disclosed herein, landing in an unfamiliar city would entail a single click to turn on the location-based map and display all relevant POI(s) in a POI Channel Set without the conventional need to perform multiple searches.

Likewise, a "Nightlife" POI Channel Set can include restaurants serving specific cuisines, music of a particular genre, concert venues, theater venues, and/or sports venues matching a user's interests, etc. In accordance with the principles disclosed herein, a single click would populate a map of a POI Channel Set with all relevant user defined content without performing multiple searches. Content is delivered to the user in a single action, eliminating conventional cumbersome search entry and parsing results, or traversing numerous hierarchies.

Figure 1:
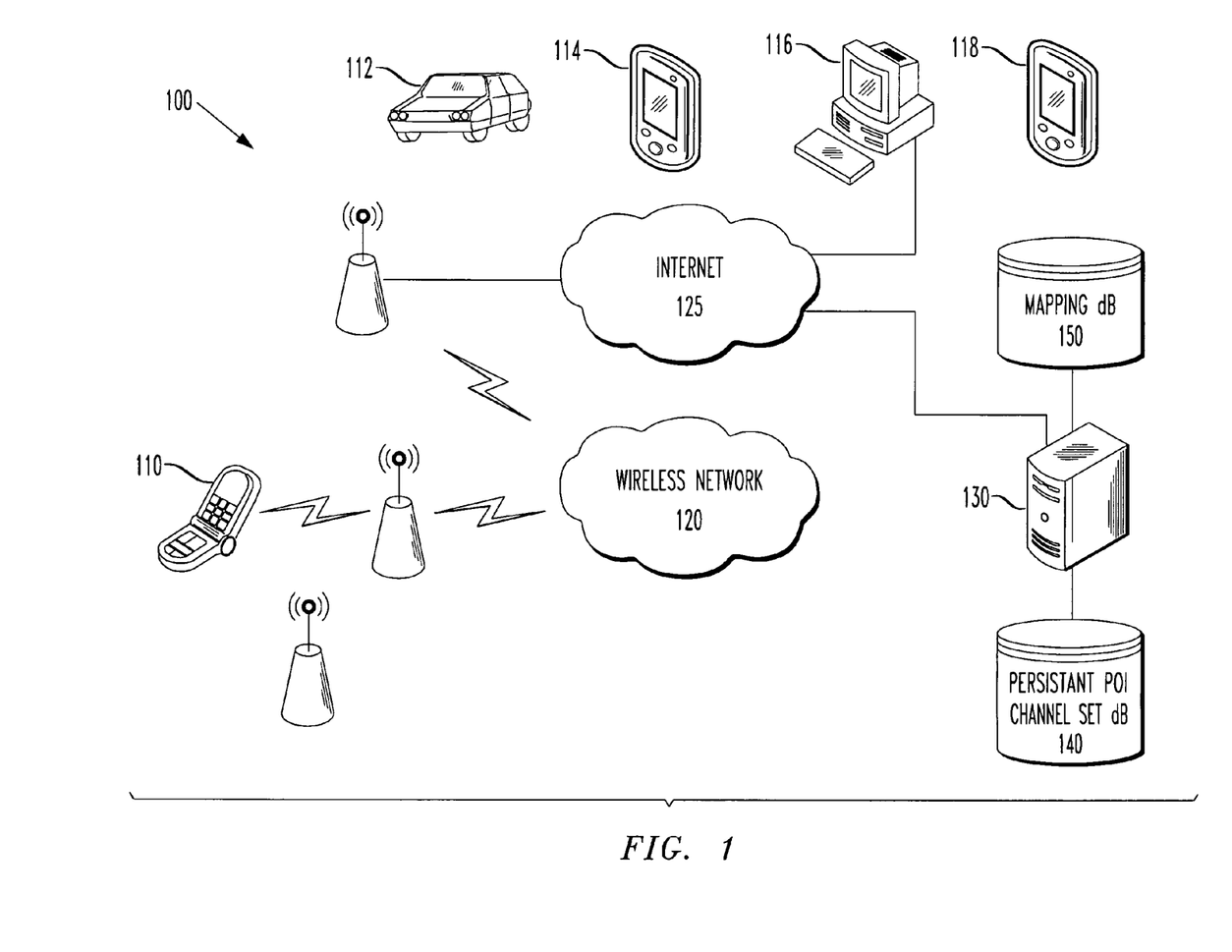
FIG. 1 shows a system for providing persistent POI channels, in accordance with the principles of the present invention.

FIG. 1 shows a system for providing persistent POI Channel Sets, in accordance with the principles of the present invention.

In particular, the system 100 for providing persistent POI Channel Sets during map viewing includes a wireless device 110, and a wireless network 120. In accordance with the principles disclosed herein, a tiled map retrieval system includes a mapping server 130, a mapping database 150, and a persistent POI Channel Set database 140.

Wireless device 110 downloads map tiles and point-of-interest data from a mapping server 130. Wireless device 110 formulates a request for a mapping tile and previously defined POI Channel Sets based on any number of search criteria that can include address(es), restaurant(s), mass transit station(s), shopping, hospital(s)s, park(s), etc. The request is transmitted over the wireless network 120 to mapping server 130. The mapping server 130 formulates a mapping database 150 query from the search criteria provided in the request for a mapping tile from the wireless device 110. The mapping tile returned from the mapping database 150 is formulated into one or more appropriate data packets and transmitted to the wireless device 110. The retrieval of a mapping tile and point-of-interest data from the mapping server 130 by a wireless device 110 is well known within the art.

In accordance with the principles disclosed herein, the mapping server 130 further stores the POI search criteria into POI Channel Sets to be used during subsequent retrieval of mapping tiles by wireless device 110. The search criteria formulated into POI channels and associated identification of a wireless device (e.g., mobile identification number or MIN) are stored in persistent POI Channel Set database 140.

During viewing of any mapping tile by wireless device 110, optionally during route guidance, a user is given the option to view previously defined POI overlaid upon any retrieved mapping tiles. Conventionally, a user must leave route guidance and enter search criteria for POIs that a user desires to see during route guidance. However, in accordance with the principles disclosed herein, during route guidance, a user can at any time selected a POI Channel Sets, and have the previously defined POI(s) data associated with the POI Channel Sets retrieved and overlaid upon the viewed map tile.

Likewise, a request for any neighboring mapping tile automatically triggers mapping server 130 to perform a search in a persistent POI Channel Set database 140 for a previously stored POI search criteria associated with a selected POI Channel Sets that is associated with a particular MIN. The previously stored search criteria retrieved from persistent POI Channel Set database 140 is used to add POI icons related to a retrieved persistent POI Channel Sets. The POI icons associated with the user selected POI Channel Sets together with a neighboring mapping tile are packaged together for transmission to a requesting wireless device 110.

Figure 4:
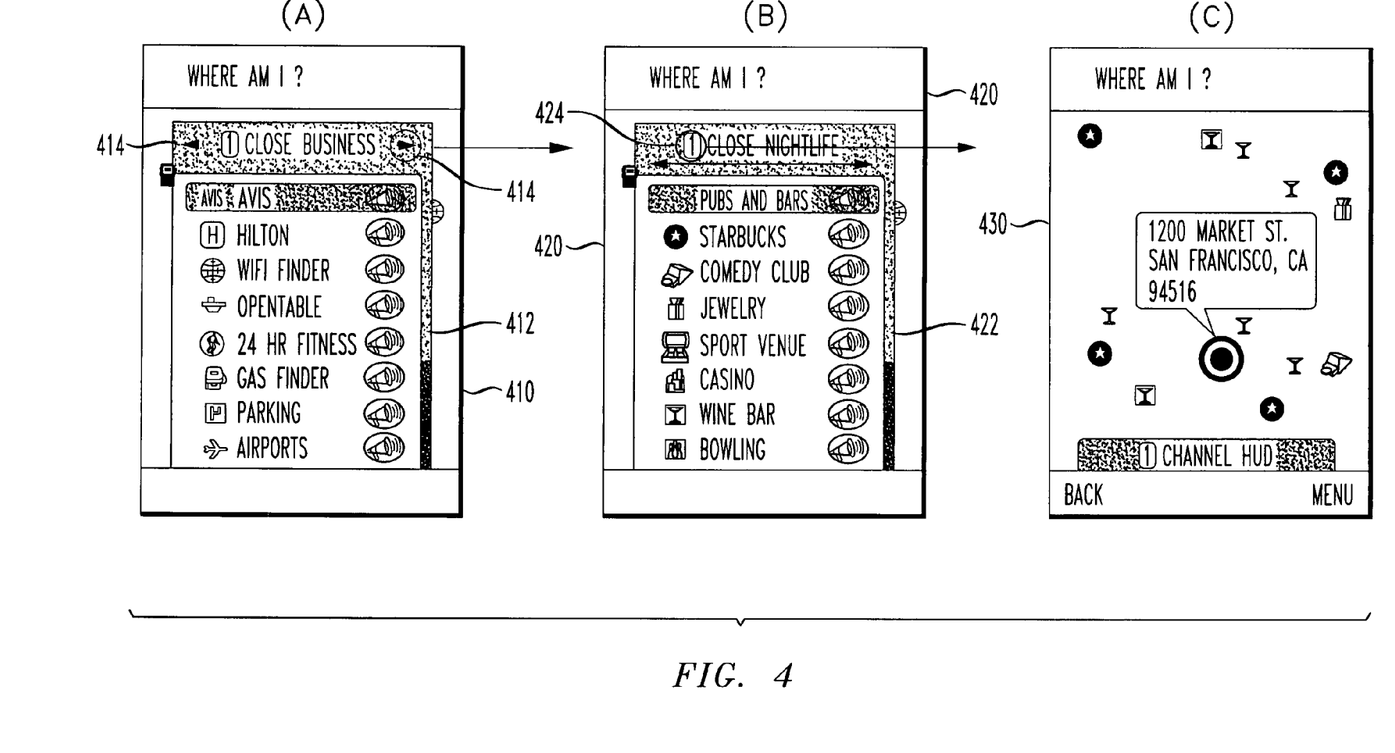
FIGS. 4(A)-4(C) show switching of Channel Sets, in accordance with the principles of the present invention.
Figure 5:
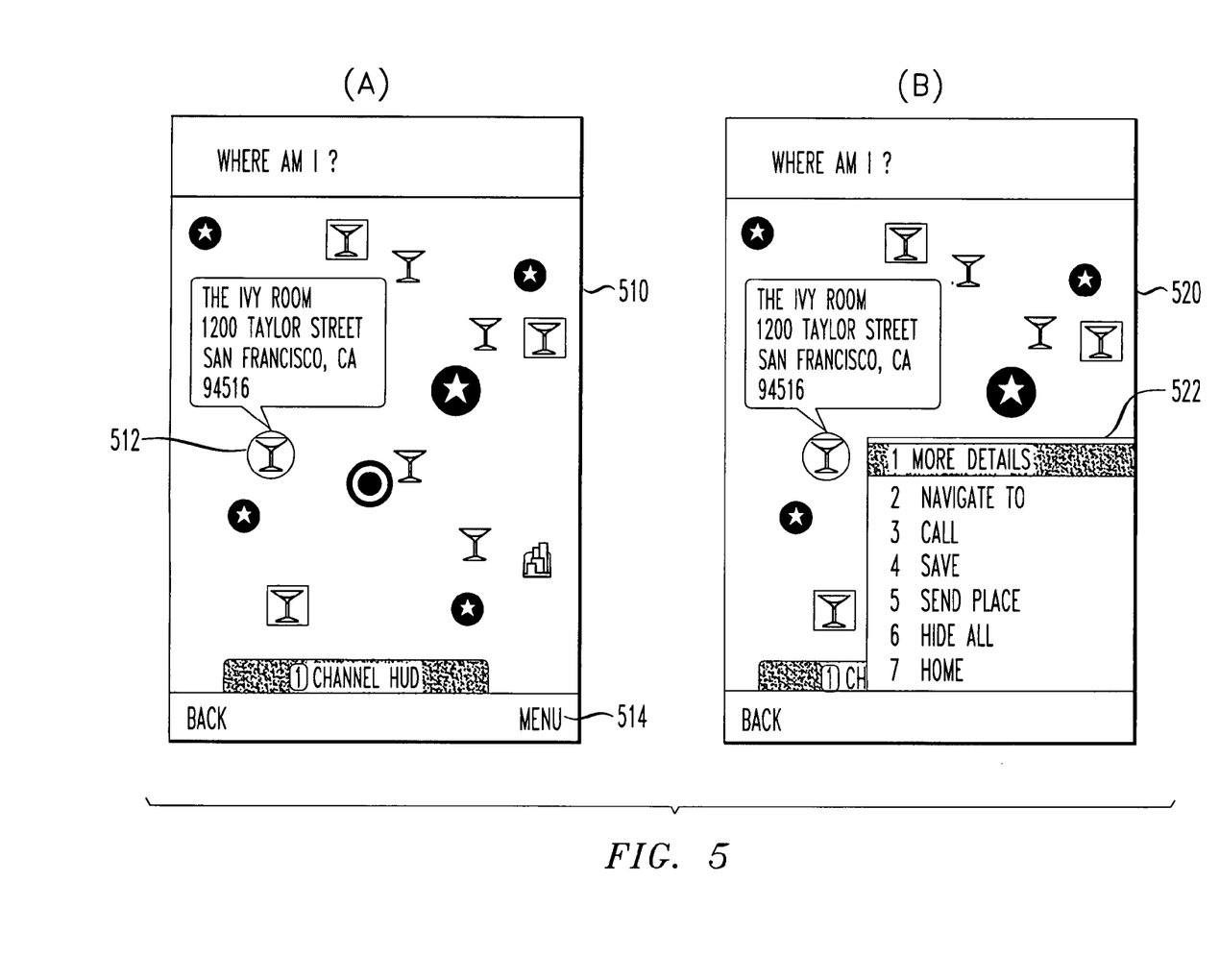
FIGS. 5(A) and 5(B) show POIs in a Channel Set, in accordance with the principles of the present invention.
Figure 6:
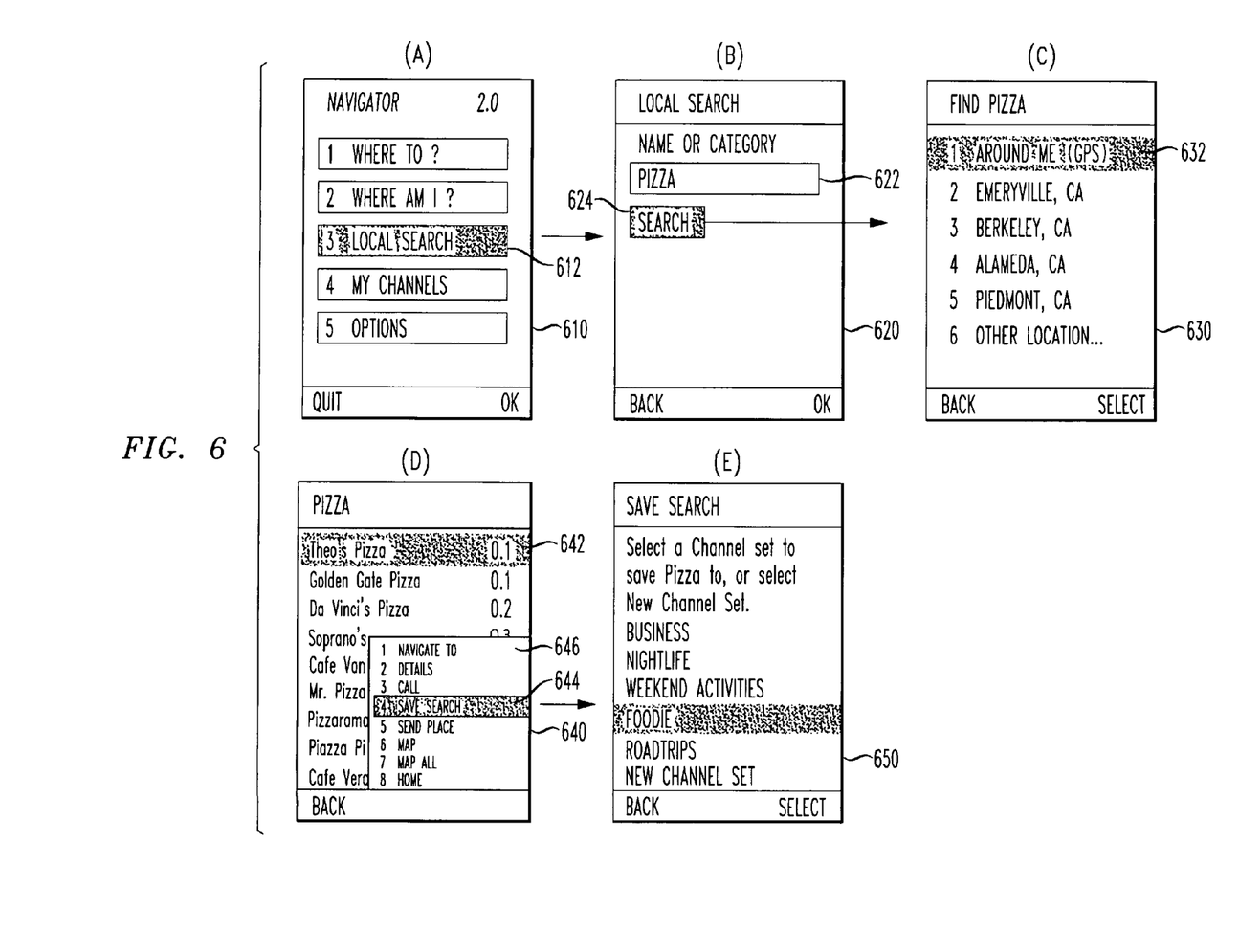
FIGS. 6(A)-6(E) show a process of saving a name for a Channel Set and a category into a Channel Set, in accordance with the principles of the present invention.

POI icon(s) associated with a POI Channel Set and its associated mapping tile, shown in more detail in FIGS. 4 and 5, are transmitted to the wireless device 110. In this manner, a user must enter search criteria for a point-of-interest only once during creation of a POI Channel Set(s). This saves a user a substantial amount of time from having to re-enter search criteria every time a user desires to view POI ions for a map tile.

The exemplary embodiment disclosed herein is for a wireless device accessing a remote mapping server 130 through a wireless network 120. However, the concepts disclosed herein apply equally to any of a number of electronic device that include in-car navigation systems 112, mobile devices 114, stand-alone dedicated navigation devices 118, web sites viewable on a personal computer 116 through the Internet 125, etc. The functions and data stored by mapping server 130, mapping database 150, and persistent POI Channel Set database 140 would likewise be performed by the components within the in-car navigation systems 112, the mobile devices 114, the stand-alone dedicated navigation devices 118, etc.

Figure 2:
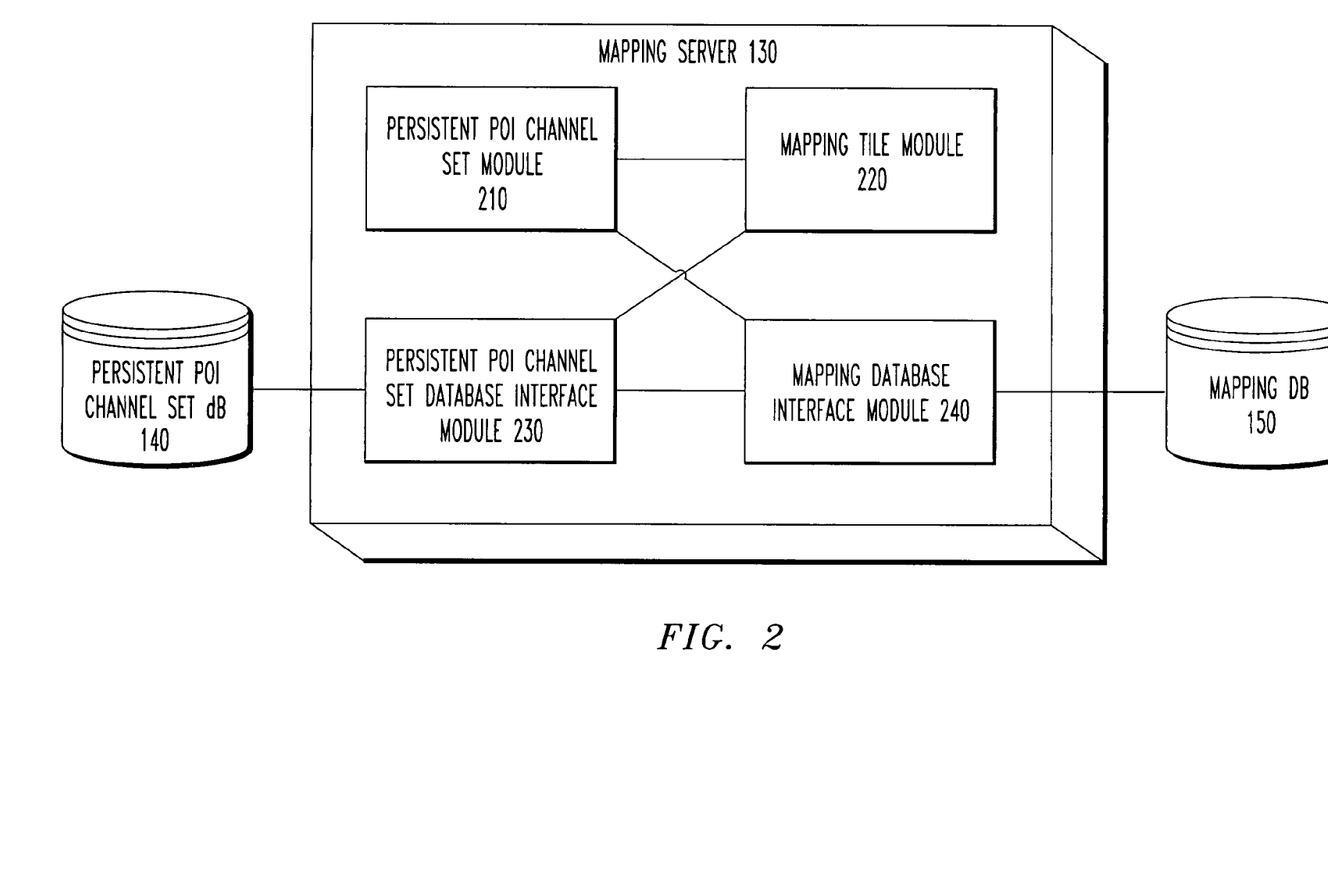
FIG. 2 shows a detailed view of a mapping server, in accordance with the principles of the present invention.

FIG. 2 shows a detailed view of a mapping server, in accordance with the principles of the present invention.

In particular, the mapping server 130 includes a persistent POI Channel Set module 210, a mapping tile module 220, a persistent POI Channel Set database interface module 230, and a mapping database interface module 240.

The mapping server 130 can provide route guidance, as is known within the art. However, in accordance with the principles disclosed herein, mapping server 130, either during route guidance or simply during map tile viewing, further provide access to the POI Channel Set features disclosed herein.

The persistent POI Channel Set module 210 communicates with a wireless device 110. The persistent POI Channel Set module 210 accepts POI search criteria from the wireless device 110 and directs the POI search criteria be stored in a POI Channel Set in association with a particular wireless device 110. As discussed above, multiple POI Channel Sets can be associated with a particular wireless device 110. A user can assign custom names to the POI Channel Sets or use predefined categories for assignment of POI Channel.

The POI Channel Set(s) in association with a particular wireless device 110 is stored in persistent POI Channel Set database 140 for future reference. Upon the mapping server 130 receiving a request for a mapping tile and a POI Channel Set, the persistent POI Channel Set module 210 can formulate a request for an appropriate mapping tile and retrieve the previously stored POI search criteria associated with a POI Channel Set from persistent POI Channel Set database 140. The previously stored POI channel(s) associated with particular wireless device 110 is/are used to retrieve POI(s) that are associated with a particular wireless device 110.

The mapping tile module 220 can formulate a database query to retrieve appropriate mapping tiles from a mapping database 150. Moreover, the mapping tile module 220 can formulate a database query to retrieve appropriate points-of-interest from the mapping database 150 based on previous stored POI search criteria associated POI Channel Set(s) stored in persistent POI Channel Set database 140.

Persistent POI Channel Set database interface module 230 can provide an interface between the persistent POI Channel Set database 140 and the persistent POI Channel Set module 210. The persistent POI Channel Set database interface module 230 can accept a persistent POI Channel Set database 140 query from the persistent POI Channel Set module 210 and provide the appropriate low level data communications to pass the query to the persistent POI Channel Set database 140. Upon the persistent POI Channel Set database 140 finding an appropriate match in response to a database query, the persistent POI Channel Set database interface module 230 provides the appropriate low level data communications to allow the mapping server 130 to communicate with the persistent POI Channel Set database 140.

The mapping database interface module 240 can provide an interface between the mapping database 150 and the mapping tile module 220. The mapping database interface module 240 can accept a mapping database 150 query from the mapping database interface module 240 and provide the appropriate low level data communications to pass the query to the mapping database 150. Upon the mapping database 150 finding an appropriate match in response to a database query, the mapping database interface module 240 provides the appropriate low level data communications to allow the mapping server 130 to communicate with the mapping database 150.

FIGS. 3(A)-3(C) show a ChannelHUD and Channel Set, in accordance with the principles of the present invention.

In particular, FIG. 3(A) shows a graphic user interface (GUI) 310 where a user selects the menu option "Where Am I?". Selection of the menu option "Where Am I?" results in display of a map tile showing the wireless device's 110 current location.

In accordance with the principles disclosed herein, a menu option "My Channels" 312 is provided for the user. Menu option "My Channels" 312 results in additional menu options (not shown) being displayed on the wireless device 110 that allows for retrieval and configuration of Channel Set(s). Configuration of Channel Sets includes naming of Channel Sets, adding and deleting POI associated with Channel Sets, renaming Channel Sets, etc.

FIG. 3(B) shows a GUI 320 that illustrates a map tile populated with POIs that a user has previously saved to a Channel Set named "Business". In accordance with the principles disclosed herein, a ChannelHUD option 322 is provided to a user of the wireless device 110. FIG. 3(B) can further optionally include a route 324 to be followed during route guidance provided by mapping server 130.

FIG. 3(C) shows a GUI 330 illustrating a user having selecting the ChannelHUD option 322 from FIG. 3(B). Selection of the ChannelHUD option 322, e.g., by clicking the 1-key on a keypad of the wireless device 110, slides the ChannelHUD up from the bottom of the screen of the GUI 320. Each POI previously saved in association with Channel Set "Business" is displayed for a user of the wireless device 110. The user of the wireless device 110 can select each POI being displayed and moved to a next Channel Set, shown in more detail in FIG. 4, created by the user, .e.g, using up/down arrow keys and left/right arrow keys on a keypad of the wireless device 110.

When a POI is selected by a user of the wireless device 110, pressing an appropriate button, e.g. an OK/Fire button (either physical or virtual), toggles visibility on/off for that particular POI on a map tile, allowing for granular control of POIs being displayed on the wireless device 110. Closing the ChannelHUD option 322 results in updating the viewed map tile with the last selected Channel Set's POI(s) populating the map tile.

FIGS. 4(A)-4(C) show switching of Channel Sets, in accordance with the principles of the present invention.

Left and right arrows options 414 can be mapped respectively to the left and right arrow keys on a keypad of the wireless device 110. Once a ChannelHUD is option is selected for display, shown in GUI 410 as ChannelHUD 412 for "Business" POIs, selection of the left and right arrows options 414 swaps the current Channel Set with the next available Channel Set. Selection of the right arrow key 414 from ChannelHUD 412 results in GUI 420 entitled "Nightlife" from FIG. 4(B) being displayed for a user of the wireless device 110, an example of which is shown in FIG. 4(C).

Selection of a "1" key on a keypad of the wireless device 110, shown on GUI 420 of FIG. 4(B) as selection 424, results in closing of ChannelHUD 422 and designates selection of ChannelHUD 422. Selection of ChannelHUD 422 entitled "Nightlife" results in a map tile being populated with the POI(s) that are associated with the ChannelHUD 422.

Preferably, if there is only a single Channel Set, the arrow options 414 are disabled. Preferably, if there are no Channel Sets that are associated with a wireless device 110, the ChannelHUD option is not presented to a user of the wireless device 110 until at least one Channel Set is created. Optionally, default Channel Sets can be created and made available to a user of the wireless device 110 by a service provider or device designer.

FIGS. 5(A) and 5(B) show POIs in a Channel Set, in accordance with the principles of the present invention.

FIG. 5(A) shows a GUI 510 illustrating a user of a wireless device 110 having selected a particular POI 512 from a plurality of available POIs. The user of the wireless device 110 can use the up/down arrow keys and left/right arrow keys on a keypad of the wireless device 110 to move from POI to POI on GUI 510. Stopping on any particular POI results in detailed information for that particular POI being displayed for a user. In the example shown, a user has arrowed to POI 512, with the name and address of the establishment being displayed for the user.

Should a user select "MENU" option 514 on GUI 510, GUI 520 shown in FIG. 5(B) is presented to the user of the wireless device 110. "MENU" option 514 provides a user with addition options in relation to POI 512. For example, a user can be provided with such options as: to view more details for POI 512, to navigate to POI 512 from their current location, to automatically retrieve the telephone number for and call the establishment associated with POI 512, to save any data associated with POI 512 for future reference, to send place, to hide all POI(s) current being viewed on a map tile, to take a user to a home menu, etc.

FIGS. 6(A)-6(E) show a process of saving a name for a Channel Set and a category into a Channel Set, in accordance with the principles of the present invention.

A user is presented with GUI 610 that lists options to the user of the wireless device 110. GUI 610 illustrates a user selecting the "Local Search" option 612. Selection of the "Local Search" option 612 results in GUI 620 shown in FIG. 6(B) being presented to the user of the wireless device 110.

GUI 620 presents a text entry box 622 for the user of the wireless device 110 to entry a text string that represents a name or category for searching POIs. Selection of the "Search" button 624 results in GUI 630 shown in FIG. 6(C) being presented to the user of the wireless device 110.

GUI 630 presents a list of locations that have POIs that match the test string entered in text entry box 622. Selection of the "Around Me (GPS)" option 632 results in GUI 640 shown in FIG. 6(D) being presented to the user of the wireless device 110.

GUI 640 presents a list of pizza establishments that are within an area that a user selected from the "Around Me (GPS)" option 632 shown in GUI 630. Selection of the establishment "Theo's Pizza" results in an addition menu 646 of options being displayed on GUI 640. The additional menu 646 of options allows a user to select a "Save Search" option 644. Selection of the "Save Search" option 644 results in GUI 650 being presented to the user of the wireless device 110.

GUI 650 presents a list of options to save the search shown in GUI 640. The user is presented with an option to select an existing Channel Set to save their "Pizza" search into and an option to created a new Channel Set to save their "Pizza" search into.

The power of the Channel Set disclosed herein lies in context switching across general categories or names relevant to users grouped into Channel Sets. Additionally, a user is able to quickly access the Channel Sets disclosed herein in different locations. Therefore, a single specific address is not useful in the context disclosed herein, especially for individuals who travel frequently or in unfamiliar areas.

Figure 7:
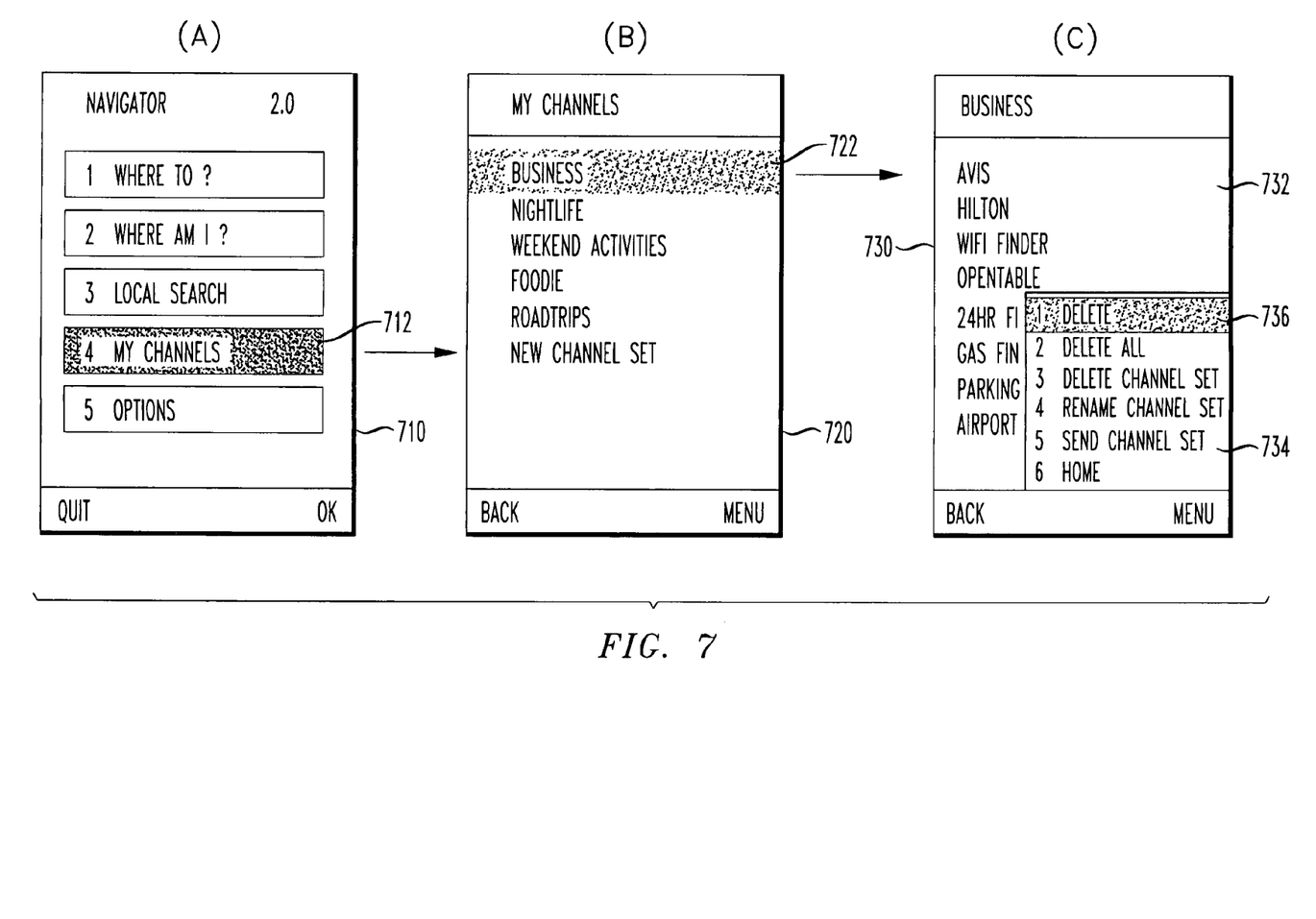
FIGS. 7(A)-7(C) show management of Channel Sets, and names or categories within a Channel Set, in accordance with the principles of the present invention.

FIGS. 7(A)-7(C) show management of Channel Sets, and names or categories within a Channel Set, in accordance with the principles of the present invention.

A user is presented with GUI 710 that lists options to the user of the wireless device 110, the same options presented in GUI 610. However, instead of a user selecting the "Local Search" option 612 as shown in GUI 610, a user instead selects the "My Channels" option 712. Selection of the "My Channels" option 712 results in GUI 720 shown in FIG. 7(B) being presented to the user of the wireless device 110.

GUI 720 presents a list of Channel Sets that the user of the wireless device 110 has previously defined and an option to create a new Channel Set. Selecting an existing Channel Set displays the current POI names or category that is associated within that Channel Set. GUI 720 shows a user having selected the "Business" Channel Set option 722. Selection of the "Business" Channel Set option 722 results in GUI 730 shown in FIG. 7(C) being presented to the user of the wireless device 110.

GUI 730 presents user predefined POIs that are associated with the "Business" Channel Set option 722. GUI 730 shows a user having selected the "AVIS" POI 732. Selection of the "AVIS" POI 732 results in another menu of options 734 being displayed for the user. The menu of options 734 shows a user having selected the "Delete" option 736 which results in the "AVIS" POI 732 being deleted from the "Business" Channel Set option 722.

The menu of options 734 allows a user to delete the selected POI name or category, delete all POI names and categories in that Channel Set, and delete an entire Channel Set and all contents within. A user may also use menu of options 734 to rename an existing Channel Set, or forward the Channel Set to another user that also has the ChannelHUD and Channel Set application disclosed herein installed on their wireless device 110. If accepted by a recipient, the forwarded Channel Set is added to the "My Channels" area of the recipient's menu options on their device.

Although not shown for simplicity of illustration, menu of options can additionally provide options that control the manner in which Channel Sets are displayed on the wireless device 110. For example, a user of a wireless device 110 can configure a particular Channel Set, or all of the Channel Sets available for selection, to display POI ions that are within a predetermined distance from either a current location of the wireless device 110 and/or a predetermined distance from a route, e.g., route 324, during route guidance. For example, a user of a wireless device 110 may choose to view only those POI(s) that are within 400 yards from either a current location of the wireless device 110 and/or a predetermined distance from a route, e.g., route 324. In this manner, a user of a wireless device 110 can further limit which POI(s) are presented on the wireless device 110 that are most relevant to the user.

Figure 8:
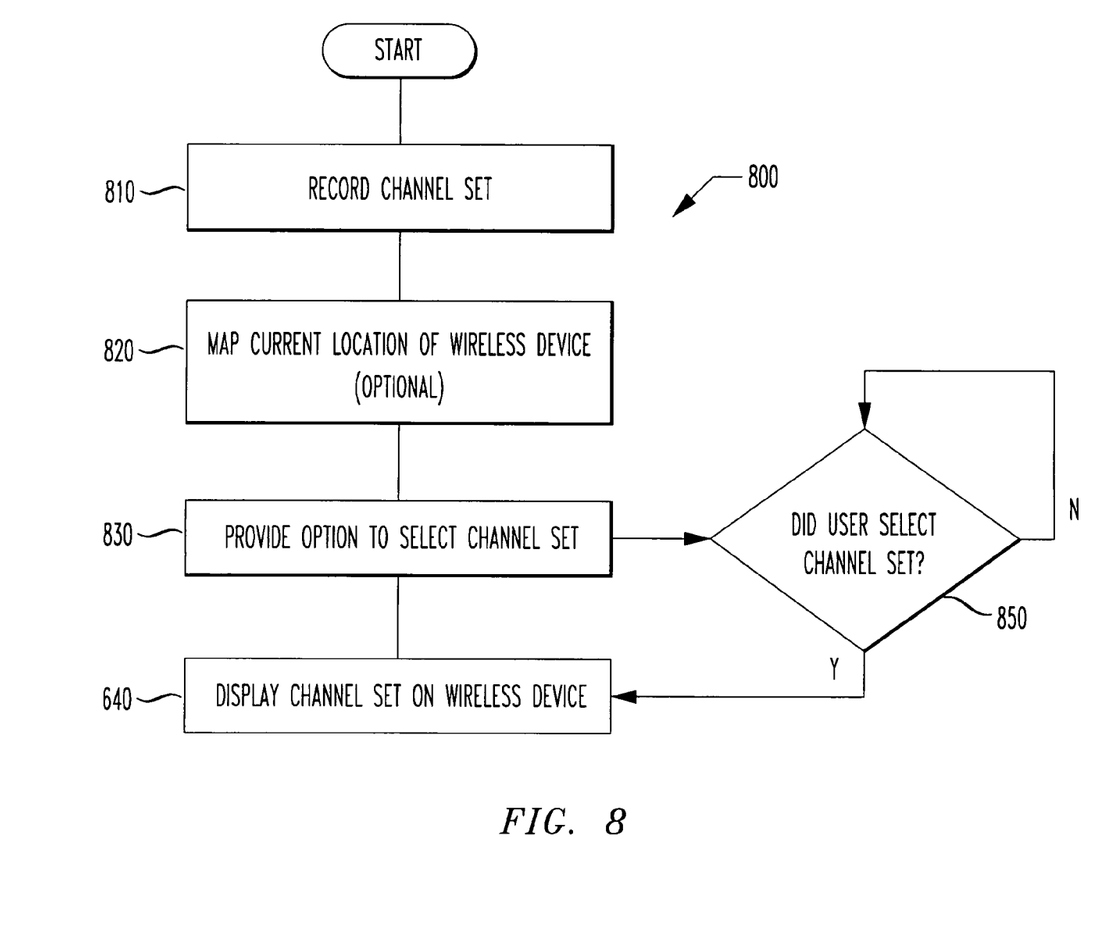
FIG. 8 shows a flow chart for a process of recording and displaying a Channel Set, in accordance with the principles of the present invention.

FIG. 8 shows a flow chart for a process 800 of recording and displaying a Channel Set, in accordance with the principles of the present invention.

At step 810, a Channel Set is recorded. Mapping server 130 can provide the various GUIs shown in FIG. 6 to the wireless device 110 that allow a user to enter search criteria for POI(s), select a POI(S), and save the POI(s) to an existing Channel Set or to a newly created Channel Set. Mapping server 130 can direct storage of the POI(s) to a particular Channel Set stored in persistent POI Channel Set database 140.

A service provider, or other third party, can optionally store canned Channel Sets in persistent POI Channel Set database 140 for the convenience of the user of the wireless device 110. Such canned Channel Sets can be provided to a user with or without the user having created Channel Sets that are associated with their particular wireless device 110.

At step 820, a user can optionally map their current location on the wireless device 110. Mapping server 130 can providing a mapping tile overlayed with an icon that represents the wireless device's 110 current location and/or provide route guidance from the wireless device's 110 current location. Mapping of a wireless device's 110 current location is well known within the art.

Figure 3:
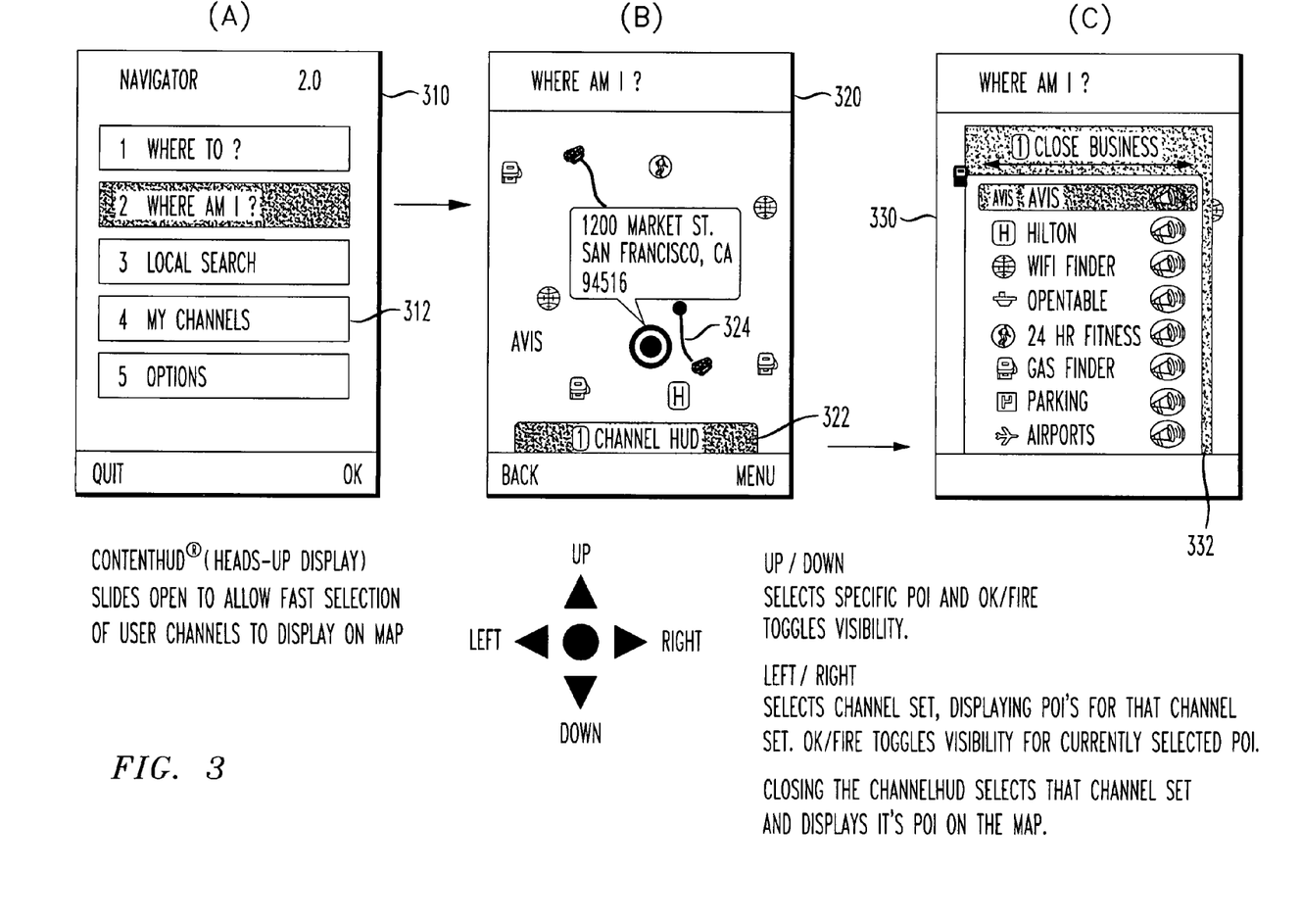
FIGS. 3(A)-3(C) show a ChannelHUD and Channel Set, in accordance with the principles of the present invention.

At step 830, a GUI is provided for the wireless device 110 that provides an option for a user of the wireless device 110 to select a previously stored Channel Set. Mapping server 130 can provide a GUI that includes a menu option for selecting a Channel Set, as shown in FIGS. 3 and 4.

At step 850, a decision is made as whether a user of the wireless device 110 has selected to view Channel Sets associated with the wireless device 110. A user selecting to view Channel Sets that are associated with their wireless device 110, or canned Channel Sets, will result in process 800 branching to step 840. A user not selecting to view Channel Sets that are associated with their wireless device 110 results in process 800 branching back to step 850 to allow for continuous monitoring for a user selection to view Channel Sets.

At step 840, one or more Channel Sets are displayed on a GUI for a user of the wireless device 110. Mapping server 130 can receive a request from a wireless device 110 for a list of Channel Sets that are associated with a particular wireless device 110. Mapping server 110 can use the wireless device's 110 identification, e.g., mobile identification number (MIN), as a basis to submit a database query to persistent POI Channel Set database 140. Any Channel Sets that are associated with that particular wireless device 110 are returned to mapping server 110. Mapping server 110 can then transmit any Channel Sets that are associated with the particular wireless device 110 to the wireless device 110 that requested the Channel Sets.

Optionally, at step 840 one or more third party Channel Sets can be transmitted to the wireless device 110. Mapping server 130 can similarly retrieve third party Channel Sets from the persistent POI Channel Set database 140. The third party Channel Sets can be transmitted to the particular wireless device 110 that requested to view the third party Channel Sets.

While the invention has been described with reference to the exemplary embodiments thereof, those skilled in the art will be able to make various modifications to the described embodiments of the invention without departing from the true spirit and scope of the invention.

What is claimed is:

1. A method of displaying a customized group of unrelated points-of-interest on a map of a navigation device, comprising:

enabling user-definition of at least two different user-defined channel sets, each comprising at least two unrelated points-of-interest (POI) for selection for navigation of only one in any given navigation route, for inclusion within said respective one of said at least two different user-defined channel sets;

providing a navigation device permitting selection of one of said at least two different user-defined channel sets;

displaying said at least two unrelated points-of-interest stored in said selected one of said at least two different user-defined channel sets overlaid upon a viewed map tile;

requesting a neighboring mapping tile; and automatically triggering mapping server to perform a search in a persistent POI Channel Set database for a previously stored POI search criteria associated with said selected user-defined channel set that is associated with a particular Mobile Identification Number (MIN).

2. The method of displaying a customized group of unrelated points-of-interest on a map of a navigation device according to claim 1, further comprising:

mapping a current location of said navigation device.

3. The method of displaying a customized group of unrelated points-of-interest on a map of a navigation device according to claim 1, wherein:

a cellular telephone is comprised of said navigation device.

4. The method of displaying a customized group of unrelated points-of-interest on a map of a navigation device according to claim 1, wherein:

said at least two unrelated points-of-interest include at least one restaurant and at least one non-restaurant.

5. The method of displaying a customized group of unrelated points-of-interest on a map of a navigation device according to claim 1, wherein:

said at least two unrelated points-of-interest include at least one mass transit system and at least one non-mass transit system.

* * * * *